(No Model.)
R. C. MORSE.
TWO WHEELED VEHICLE.
No. 274,636. Patented Mar. 27, 1883.
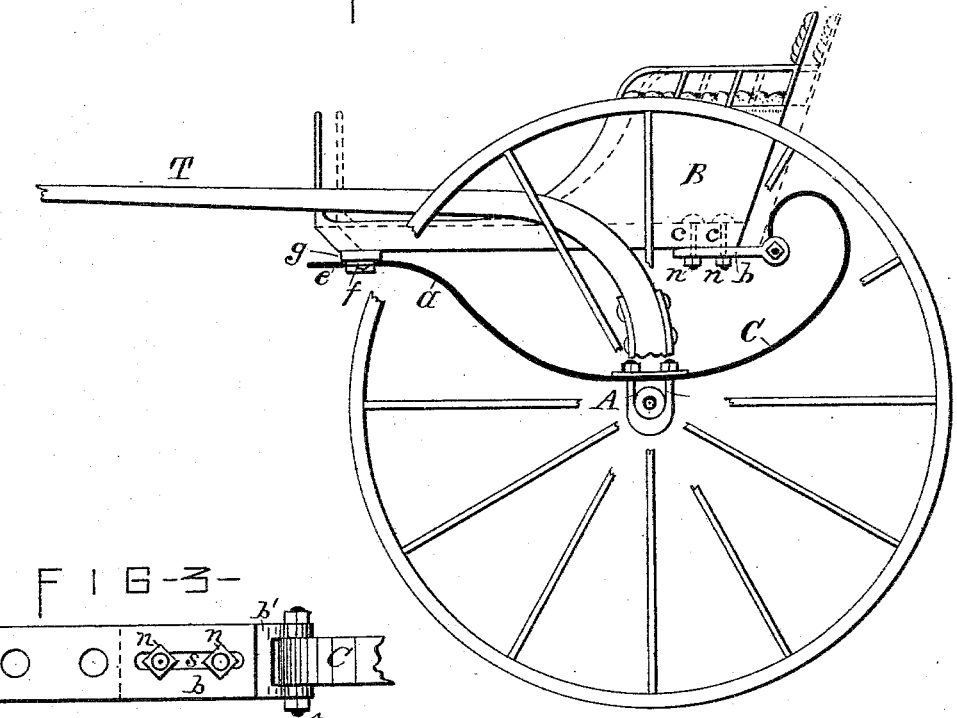
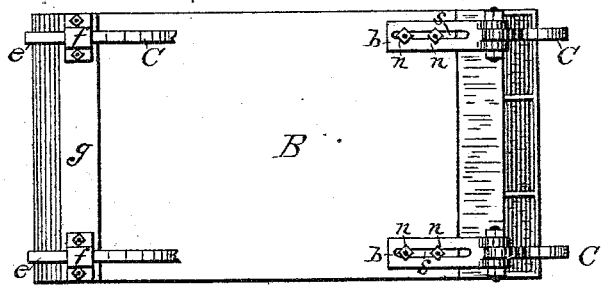
Witnesses —
Wm. C. Raymond
C. Bendixon
Inventor —
Roswell C. Morse
by Duell, Soass & Hey
his Attys

UNITED STATES PATENT OFFICE.

ROSWELL C. MORSE, OF SYRACUSE, NEW YORK.

TWO-WHEELED VEHICLE.

SPECIFICATION forming part of Letters Patent No. 274,636, dated March 27, 1883.

Application filed November 7, 1882. (No model.)

*To all whom it may concern:*

Be it known that I, ROSWELL C. MORSE, of Syracuse, in the county of Onondaga, in the State of New York, have invented new and useful Improvements in Road-Carts, of which the following, taken in connection with the accompanying drawings, is a full, clear, and exact description.

This invention relates to a class of sulkies which are usually termed "English road-carts," the invention consisting in a novel combination and arrangement, with the single axle, of a C-spring mounted thereon, and the body of the vehicle supported directly on the ends of said spring without the aid or intervention of cross-springs; and the invention also consists in certain novel means for adjustably connecting the body with the aforesaid C-spring, all as hereinafter more fully described, whereby the cost of construction is materially reduced and the cart is caused to ride much easier.

In the accompanying drawings, Figure 1 is a side elevation of my improved road-cart with a portion of the wheels broken away, to better illustrate the invention, the dotted lines illustrating the adjustability of the position of the body; and Fig. 2 is an inverted plan view of the body of the cart, and Figs. 3 and 4 are enlarged top and side views, respectively, of a modification of the attachment of the rear end of the spring with the rear end of the body.

Similar letters of reference indicate corresponding parts.

A represents the axle, and B the body, of the cart, supported over the axle by a C-spring, C, which is firmly secured at or near the center of its length to the axle by any of the well-known means, and has the body B supported or hung directly on the two extremities of the spring without the intervention of the usual cross-springs. The forward portion of the spring C is formed with a reverse curve, as shown at *a*, so as to bring the extremity *e* into a horizontal position, said extremity passing loosely through a box or sleeve, *f*, which is rigidly attached to the cross-bar *g*, fixed to the under side of the forward end of the body B. The rear end of the spring C is connected to a plate, *b*, which is provided with a longitudinal slot, *s*, and is adjustably secured to the under side of the rear end of the body, either by placing said plate directly on the bottom of the body and fastening it in position by bolts *c c*, passing through the side rail of the frame of the body and through the slot of the plate *b*, and provided with clamping-nuts *n*, as shown in Fig. 1 of the drawings, or by bolting said slotted plate *b* to another plate, *b'*, permanently fixed to the body B, as represented in Fig. 4 of the drawings. Said connection of the slotted plate *b* with the body B allows the latter to be set forward or backward to properly balance it over the axle. The thill T is rigidly attached to the axle, and has no connection with the body, the support of the latter depending on the rigid fastenings of the spring and that of the thill on the axle, the body being thus to a great extent relieved of the rocking motion incident to the vibration of the thill.

It will be observed that the sliding connection of the forward end of the spring C with the forward end of the body affords ample play to the spring to render the riding of the vehicle perectly easy.

Having described my invention, what I claim as new, and desire to secure by Letters Patent, is—

1. A single-axle vehicle having its body supported and balanced over the axle by C-springs mounted on the axle, and having its two extremities connected respectively with opposite ends of the body, substantially as shown and described.

2. In combination with the axle A and body B, the C-spring C, provided at its forward end with the sliding connection *e f*, and having its rear end adjustably connected with the body, whereby said body may be set forward or backward to balance the same over the axle, substantially as set forth.

In testimony whereof I have hereunto signed my name and affixed my seal, in the presence of two attesting witnesses, at Syracuse, in the county of Onondaga, in the State of New York, this 28th day of October, 1882.

ROSWELL C. MORSE. [L. S.]

Witnesses:
WM. C. RAYMOND,
FREDERICK H. GIBBS.